United States Patent
Holappa et al.

(10) Patent No.: US 8,468,382 B2
(45) Date of Patent: Jun. 18, 2013

(54) METHODS AND EQUIPMENT FOR FAULT TOLERANT IP SERVICE

(75) Inventors: Marko Holappa, Oulu (FI); Juha Kemppainen, Oulu (FI)

(73) Assignee: Elektrobit Wireless Communications Oy, Oulu (FI)

( * ) Notice: Subject to any disclaimer, the term of this patent is extended or adjusted under 35 U.S.C. 154(b) by 251 days.

(21) Appl. No.: 12/935,185

(22) PCT Filed: May 8, 2008

(86) PCT No.: PCT/FI2008/050252
§ 371 (c)(1),
(2), (4) Date: Sep. 28, 2010

(87) PCT Pub. No.: WO2009/135984
PCT Pub. Date: Nov. 12, 2009

(65) Prior Publication Data
US 2011/0022885 A1    Jan. 27, 2011

(51) Int. Cl.
*G06F 11/07* (2006.01)
(52) U.S. Cl.
USPC .................................. 714/1; 714/4.1; 714/4.4
(58) Field of Classification Search
USPC ................................. 714/4.4, 1, 4.1
See application file for complete search history.

(56) References Cited

U.S. PATENT DOCUMENTS

| | | | | |
|---|---|---|---|---|
| 6,424,700 | B1 * | 7/2002 | Thibon et al. | 379/32.04 |
| 7,693,136 | B1 * | 4/2010 | Blair et al. | 370/352 |
| 2005/0007445 | A1 * | 1/2005 | Foote et al. | 348/14.08 |
| 2005/0036482 | A1 | 2/2005 | Goroshevsky et al. | |
| 2005/0122923 | A1 * | 6/2005 | Jang et al. | 370/310 |
| 2006/0067237 | A1 * | 3/2006 | Burns et al. | 370/241 |
| 2006/0077955 | A1 | 4/2006 | Poustchi et al. | |
| 2006/0104207 | A1 * | 5/2006 | Ostrosky | 370/241 |
| 2007/0036147 | A1 * | 2/2007 | Nejah | 370/352 |
| 2007/0047571 | A1 * | 3/2007 | Kandikonda et al. | 370/449 |
| 2007/0239824 | A1 * | 10/2007 | Shaffer et al. | 709/204 |
| 2008/0049637 | A1 * | 2/2008 | Morrill et al. | 370/252 |
| 2008/0247533 | A1 * | 10/2008 | Ebling et al. | 379/265.09 |
| 2009/0052436 | A1 * | 2/2009 | Kotera et al. | 370/352 |
| 2009/0080337 | A1 * | 3/2009 | Burns et al. | 370/248 |

(Continued)

FOREIGN PATENT DOCUMENTS

WO    2008032014 A1    3/2008

OTHER PUBLICATIONS

Yichuan Wu, "SSCS: A Serverless SIP-Based Communication System", IEEE Globecom 2007 Proceedings, pp. 2146-2150 (2007).

(Continued)

*Primary Examiner* — Chae Ko
(74) *Attorney, Agent, or Firm* — Hoffmann & Baron, LLP (57) ABSTRACT

An Internet Protocol (IP) terminal, comprises communication means for communicating via an IP network, a processor and memory. The memory contains an operating software for the IP terminal and the processor is configured to execute the operating software. The operating software comprises a normal mode logic for implementing a normal mode operation and a restricted mode logic for implementing a restricted mode operation. The normal mode logic comprises program code for initiating a call of a first type under control of instructions from one or more dedicated servers. The restricted mode logic comprises program code for collecting connection information of other IP terminals and for initiating a call of a second type without instructions from the one or more dedicated servers.

14 Claims, 4 Drawing Sheets

U.S. PATENT DOCUMENTS

| | | | |
|---|---|---|---|
| 2009/0083272 A1* | 3/2009 | Li et al. | 707/9 |
| 2009/0083374 A1* | 3/2009 | Saint Clair | 709/203 |
| 2009/0119725 A1* | 5/2009 | Park et al. | 725/106 |
| 2009/0122791 A1* | 5/2009 | Ruetschi et al. | 370/352 |
| 2009/0316687 A1* | 12/2009 | Kruppa | 370/352 |
| 2009/0319913 A1* | 12/2009 | Serr et al. | 715/753 |
| 2010/0161728 A1* | 6/2010 | Drozt et al. | 709/204 |
| 2011/0060586 A1* | 3/2011 | Dhawan et al. | 704/231 |
| 2011/0299387 A1* | 12/2011 | Eydelman et al. | 370/225 |

OTHER PUBLICATIONS

Tapio Ikaheimo, International Search Report for corresponding International Application No. PCT/FI2008/050252, Feb. 5, 2009, pp. 1-3.

Tapio Ikaheimo, International Preliminary Report on Patentability for corresponding International Application No. PCT/FI2008/050252, Mar. 15, 2010, pp. 1-6.

\* cited by examiner

METHODS AND EQUIPMENT FOR FAULT TOLERANT IP SERVICE

CROSS-REFERENCE TO RELATED APPLICATION

This application is a National Phase application of International Application No. PCT/FI/2008/050252, filed May 8, 2008, which is incorporated herein by reference.

BACKGROUND

1. Field

The invention relates to methods, equipment and software products for fault tolerant Internet Protocol (IP) service.

2. Description of the Related Art

Voice over Internet Protocol (VoIP) service relates to transmission of voice traffic in data packets in a network supporting Internet Protocol (IP). When the present invention is made, state of the art in VoIP service was defined in Internet standards RFC3550: A Transport Protocol for Real-Time Applications ("RTP"); RFC2543, RFC3261: A Session Initiation Protocol ("SIP"); RFC2327: Session Description Protocol ("SDP"); RFC3264: An Offer/Answer Model with the Session Description Protocol ("SDP"); RFC3515: The Session Initiation Protocol ("SIP") Refer Method; and RFC 3265: Session Initiation Protocol ("SIP")-Specific Event Notification. It is to be noted, however, the VoIP development is an ongoing process, and the invention is equally applicable to future VoIP developments.

A key element in VoIP service is Session Initiation Protocol Server, or SIP server. The SIP protocol operates with user agents and user agent servers. The server's task is to provide name-to-address resolution and location management in respect of the user. Other services which are essential to full operation of VoIP service network include Dynamic Host Configuration Protocol (DHCP) which is a client-server networking protocol. A DHCP server provides configuration parameters specific to the DHCP client host requesting, generally, information required by the client host to participate on an IP network. DHCP also provides a mechanism for allocation of IP addresses to client hosts.

A VoIP service network comprises terminals and local-area network (LAN) switches and/or hubs, which may be integrated to the terminal functionality. A VoIP service network may implement point-to-point and group/conference calls.

A problem arises when one or more of the VoIP servers are out of service. For instance, absence of the SIP server makes conventional group calls impossible. Absence of the DHCP server is an even worse problem, which would result in total loss of communication as terminals are unable to resolve IP addresses. Use of static IP addresses is generally impractical in real-world networks with large numbers of roaming terminals.

While the above description of problems of prior art networks relate to VoIP traffic, those skilled in the art will realize that similar problems affect other types of communication, such as data traffic.

SUMMARY

An object of the invention is to improve fault-tolerance of existing IP service networks. The object of the invention is achieved by terminal equipment, methods and software products as specified in the attached independent claims. The dependent claims and the following description and drawings relate to specific embodiments and optional features of the invention.

An aspect of the invention is an IP terminal according to claim 1. Specifically, the IP terminal according to the invention comprises communication means for communicating via an IP network. The IP terminal further comprises a processor and memory, wherein the memory contains an operating software for the IP terminal and the processor is configured to execute the operating software. The operating software comprises a normal mode logic for implementing a normal mode operation and a restricted mode logic for implementing a restricted mode operation. The normal mode logic comprises program code for initiating a call of a first type. Calls of the first type mean calls that take place under control of instructions from one or more dedicated servers. The restricted mode logic comprises program code for collecting connection information of other IP terminals and for initiating a call of a second type, which means calls taking place without instructions from the one or more dedicated servers.

A terminal according to the invention is thus capable of normal mode operation substantially in compliance with the above-identified RFC standards. More particularly, the normal mode operation involves making use of the facilities provided by a conventional SIP server. In restricted mode operation, however, the terminal according to the invention is capable of participating in point-to-point and/or group calls, both as an initiator and as an invited participant, without the SIP server. Terminals in the same LAN area are able to create a restricted mode IP network without using external servers, by connecting to one another via switches or hubs.

Thus the inventive terminal improves redundancy of IP networks because no single server is crucial. Instead any terminal can act as a temporary group call server and/or IP address handler. In order to keep the added complexity of the terminals reasonable, group calls in restricted mode may be more restricted than conventional group calls, ie, group calls organized by dedicated SIP servers. In the following, a group call organized by a dedicated SIP server will be called a group call of a first type, while a group call organized by a terminal, in absence of the dedicated SIP server, will be called a group call of a second type. Group calls of the second type may be more restricted than group calls of the first type, although this is not absolutely necessary. For instance, the processor of a typical single-user terminal may not possess sufficient processing power for combining voices from several group call participants, but second-type group calls may nevertheless be implemented in half-duplex mode. Half-duplex mode means that only one participant can speak (transmit) at a time. Accordingly, an embodiment of the terminal comprises means for allocating a transmission privilege to one participating terminal at a time. For instance, the means for allocating a transmission privilege may comprise means for implementing a token-passing resource reservation scheme which may be implemented such that a virtual token, the possession of which indicates the transmission privilege, is initially possessed by the terminal initiating the group call. The initiating terminal receives a token request from another terminal and gives the token to the requesting terminal. While that terminal holds the token, the initiating terminal may buffer any token request sent by other terminals. If the terminal holding the token holds it for a time exceeding some predetermined limit, the initiating terminal may force the token-holding terminal to release the token. Further token requests from other terminals may be prioritised based on the length of time since those terminals last held the token. For example, a terminal that hasn't held the token for a long time is prioritised higher than a terminal that held the token recently. Alternatively or additionally, the token requests from other terminals may be negatively prioritised based on the proportion of time the terminals have held the token. For instance, a terminal having held the token for 10% of the time is prioritised over another terminal having held the token for 30% of the time. As a further option, token requests may be prioritised based on the role assigned to the terminal. Roles will be described in the following.

The terminal is preferably configured to output an audible and/or visual indication of the transmission privilege allocated to the terminal, such as the possession of the token, because this is an indication to the terminal user that he/she can now speak.

Another optional feature for enhancing the functionality of the terminal is means for assigning a role to the terminal and means for originating a call to another terminal and/or for responding to a call from another terminal, wherein the call is addressed on the basis of the role assigned to the terminal that receives the call. The terminal may assign the role in response to a user input. For instance, the user of a terminal being used by persons patrolling on route abc or watching gate xyz may use the terminal's user interface to create a role or to select a pre-created role labelled "patrol route abc" or "watch gate xyz". A benefit of such role-based communication is that the terminals according to this embodiment and their users can communicate with other terminals without having to know the identity of the receiving terminal or its user.

An embodiment of the terminal according to the invention further comprises means for spontaneous mode transition from the normal mode operation to the restricted mode operation in response to a detection that normal network service is not available. A benefit of this embodiment is that no human action is required to detect the absence of normal network service. For instance the spontaneous transition to restricted mode operation can be triggered by a positive determination that a connection to the IP network and/or to the dedicated SIP server is lost. Absence of the dedicated servers can be detected by sending ICMP echo messages to the server ("pinging"). It is beneficial to implement a mode of operation wherein one terminal, for instance the terminal having the highest MAC address within the current subnetwork, performs the pinging and informs other terminals of the subnetwork or group as soon as a server is missing.

A conventional terminal accepts an address allocated by a dedicated DHCP server. An embodiment of the terminal according to the invention further comprises means an IP address handler which replaces the dedicated DHCP server and is configured to allocate an IP address to the terminal itself. The IP address handler may comprise a dynamic network topology handler which comprises program code for periodically broadcasting the terminal's own presence and for gathering presence information from presence broadcasts of other terminals. Those skilled in the art will understand that the term topology will be used in a loose sense, and for the purposes of the present invention, the topology of a subnetwork is sufficiently defined by the terminals and network elements present in the subnetwork and their IP addresses. In other words, topology of a subnetwork refers to the collection of IP address present in the subnetwork.

BRIEF DESCRIPTION OF THE DRAWINGS

In the following the invention will be described in greater detail by means of specific embodiments with reference to the attached drawings, in which FIG. 1 schematically illustrates signalling relating to group calls in a restricted mode VoIP network.

DETAILED DESCRIPTION

Figure 1:
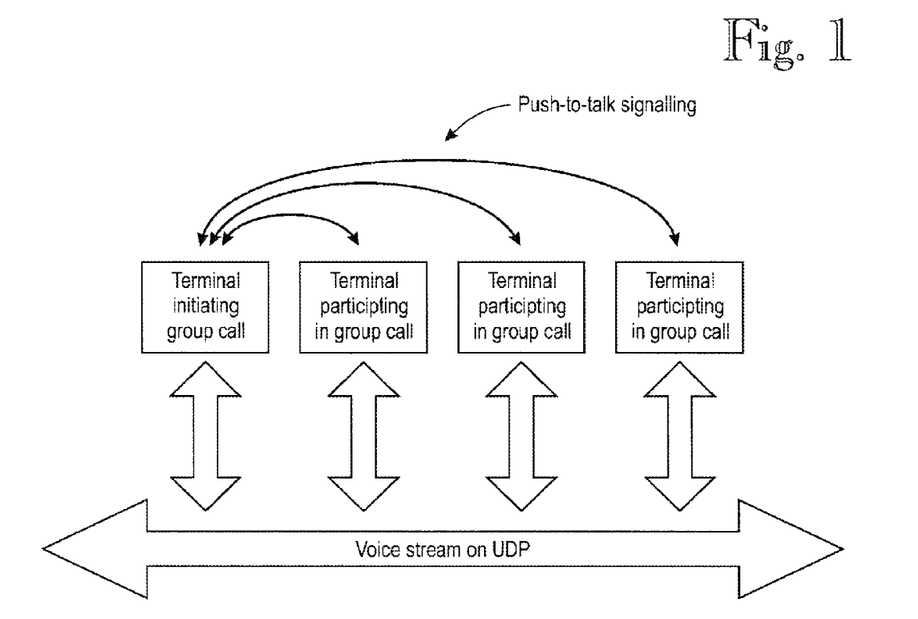

FIG. 1 schematically illustrates signalling relating to group calls in a restricted mode VoIP network. As stated earlier, a dedicated SIP server (not shown) is responsible for group call establishment in normal (full) operation of a VoIP network, in accordance with RFC standards 2500, 3261, 2543, 2327, 3264 3515 and 3265. The terminals and network elements according to the present invention may be implemented such that in normal operation, the terminals and network elements operate in a conventional manner, and the departure from the prior art is only evident in restricted mode of the VoIP network wherein at least one key functionality of the network is missing, as specified later in connection with FIG. 5.

In restricted mode the terminals and network elements according to the present invention are capable of establishing group calls without a dedicated SIP server and/or DHCP server. Instead a terminal that needs to initiate a conference call acts as a SIP server. In the following, the term "integrated SIP server" refers to the SIP server functionality integrated into the terminal. In order to keep system complexity within reasonable limits, the integrated SIP server may be implemented in a more limited manner compared to the operation of a dedicated SIP server. For instance, group calls may be implemented in half duplex mode only, which means that group call participants do not transmit simultaneously but in sequence, after one another. In one representative implementation, the sequential (as opposed to simultaneous) transmission may be controlled by token passing, as will be described in more detail in connection with FIG. 3. For example, in one non-restrictive implementation, the terminal currently holding the token may transmit media as a UDP broadcast stream which is received by other participating terminals.

Figure 2:
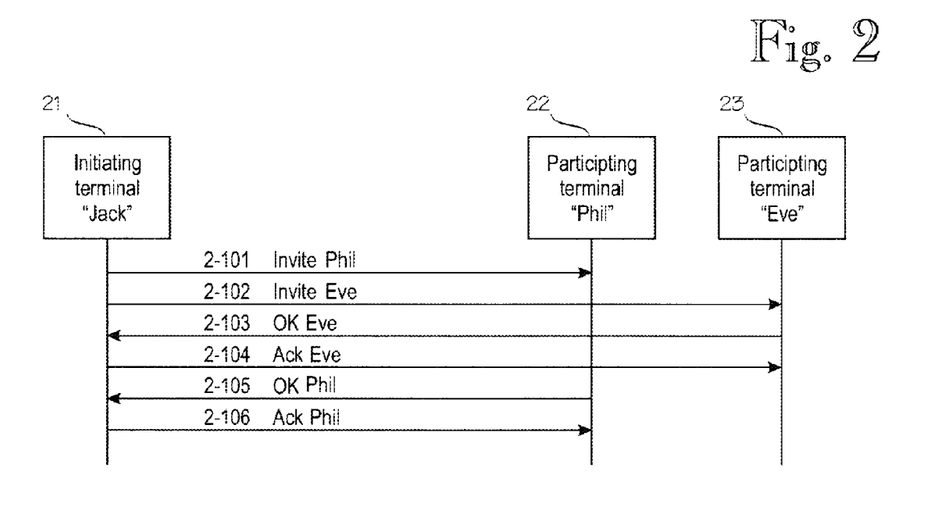
FIG. 2 is a signalling diagram relating to hypothetical set of events during group call establishment in a restricted mode VoIP network.

FIG. 2 is a signalling diagram relating to hypothetical set of events during group call establishment in a restricted mode VoIP network. As stated earlier, restricted mode means that a dedicated SIP server is not available, and one of the terminals acts as a temporary SIP server. In the scenario shown in FIG. 2, terminal 21, labelled "Jack" after its user, acts as a temporary server in the setup phase of a group call which involves two other terminals 22 and 23, labelled "Phil" and "Eve". In steps 2-101 and 2-102, the terminal 21 of Jack, acting as the temporary server, sends group call invitation messages to terminals 22 "Phil" and 23 "Eve". In step 2-103, terminal 23 "Eve" sends an OK message to the server terminal 21, which sends an acknowledgment message to terminal 23 "Eve" in step 2-104. Steps 2-105 and 2-106 are similar to steps 2-103 and 2-104 but relate to control terminal 22 "Phil". The signalling messages 2-101 through 2-106 shown in FIG. 2 can be similar to those used in conventional VoIP group call establishment, and the key difference between the conventional VoIP group call and the present invention is that in restricted mode, wherein a dedicated SIP server is not available, its functionality is implemented by one of the terminals which are to participate in the group call. Group call establishment may be responsive to an instruction via the terminal's user interface. The instruction to set up a group call may be received via the terminal's keypad, touch-sensitive display or via voice recognition, for example.

Figure 3:
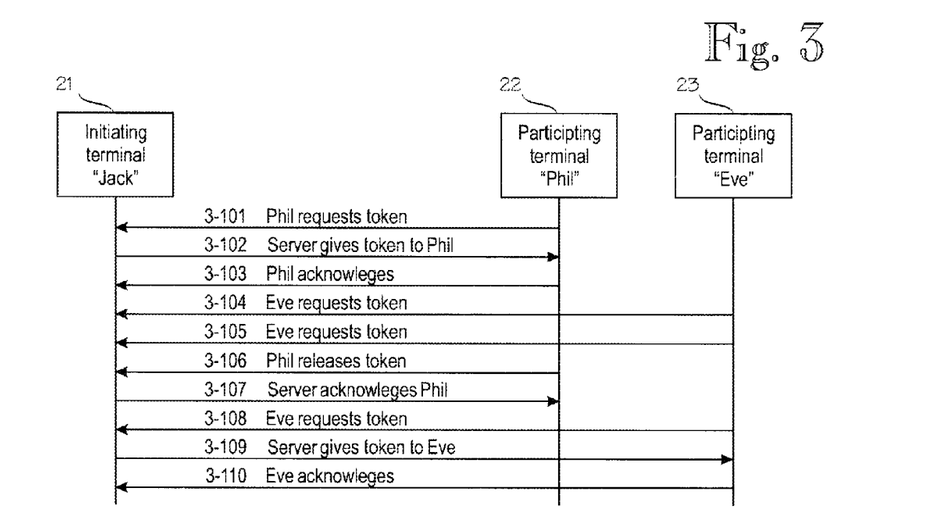
FIG. 3 shows a signalling diagram relating to hypothetical set of events during push-to-talk reservation signalling in a restricted mode VoIP network.

FIG. 3 shows a signalling diagram relating to hypothetical set of events during talk permission reservation signalling in a restricted mode VoIP network. The embodiment shown in FIG. 3 is an implementation of a token-passing resource reservation.

In step 3-101, terminal 22 "Phil" sends a token request to the temporary server, namely terminal 21 "Jack". In step 3-102, terminal 21 "Jack" gives the token to terminal 22 "Phil" which acknowledges the token in step 3-103. Terminal 22 "Phil" is now the only terminal of the group with the permission to talk. In two consecutive steps 3-104 and 3-105, terminal 23 "Eve" requests the token from the temporary server, namely terminal 21 "Jack", but terminal 21 cannot give the token because it is presently assigned to terminal 22 "Phil". In step 3-106 terminal 22 "Phil" releases the token and the token release is acknowledged by terminal 21 "Jack" in step 3-107. In step 3-108 terminal 23 "Eve" again requests the token and receives it in step 3-109. In step 3-110 terminal 23 "Eve" acknowledges the token.

In summary, FIG. 3 shows signalling steps among one temporary server and two other participating terminals, one of which obtains the token and releases it after which the other terminal can obtain the token. A benefit of the token passing technique is that it is relative easy to implement, considering the fact that a dedicated server's functionality is temporarily handled by one of the participating terminals. A consequence of the simplicity is the fact that only half-duplex operation is supported, and more elaborate embodiments of the invention may have more processing power and be able to implement audio-summing schemes, thus supporting full duplex operation.

FIGS. 1 to 3 have been described in connection with VoIP traffic, but the considerations are applicable to other types of traffic, such as data traffic.

Figure 4:
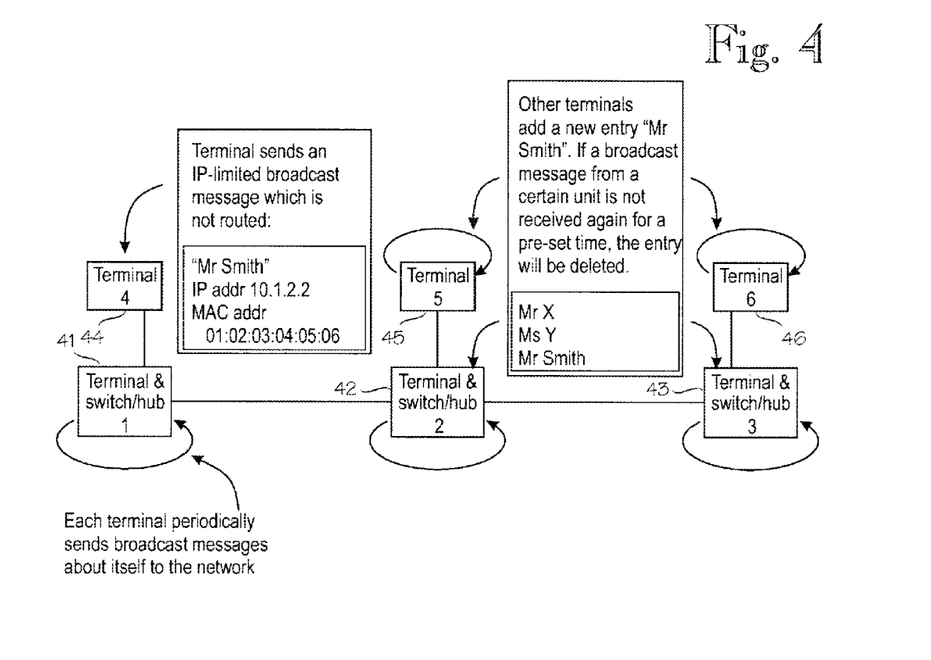
FIG. 4 illustrates signalling relating to presence broadcasting as utilized by a network topology handler according to an embodiment of the invention.

FIG. 4 illustrates signalling relating to presence broadcasting as utilized by a network topology handler according to an embodiment of the invention. By definition, in a restricted mode network one or more network elements or inter-element connections are out of operation but the remaining network elements and terminals have no a priori knowledge concerning which element or connection is malfunctioning or missing. Accordingly, the terminals of the inventive IP network implement a dynamic network topology handler as schematically shown in FIG. 4. Each terminal periodically broadcasts messages about itself. In the illustrative example shown in FIG. 4, terminal 44 broadcasts its identity information which may include the role name of the terminal ("Mr Smith"), IP address (herein: "10.1.2.2") and MAC address (herein "01:02:03:04:05:06"). On receiving this information, the other terminals 45 and 46 add the identity information of terminal 44 (labelled "Mr Smith") into their network topology data. In the context of the present invention, the term "topology" has a broad definition and means collected connection information on other terminals, ie, information specifying how to connect calls to the other terminals. For example, such connection information can be include the IP address, MAC address and/or role name of the terminals. In order to keep the network handling dynamic and adaptive, it is beneficial to implement a feature wherein, if the broadcasted identity information of a certain unit is not received for a predetermined time, the entry for that unit is deleted. Accordingly, each unit should periodically broadcast its identity information and the predetermined time for deleting identity information of terminals whose identity information broadcasts have not been received is longer than the period between successive identity information broadcasts. It is also beneficial to send presence broadcasts regularly with a predefined period, even when all role information is not available for the terminal. This allows other terminals to determine IP addresses being used by others.

In addition, each terminal comprises a fault-state/normal-state handler which is coupled with the network topology handler whose operation was discussed in connection with FIG. 4. The fault-state/normal-state handler determines whether or not a connection to a SIP server is available. The connection to the SIP server may be tested by polling the SIP server, for example. Each terminal in the same broadcast area knows the (Ethernet) MAC address of every other unit. In an illustrative implementation, the unit having the highest MAC address regularly polls the SIP server. If the SIP server fails to respond to the poll, the polling unit may perform another polling attempt. If the SIP server fails to respond to the polling attempt(s), the unit performing the polling may broadcast messages to the network, indicating that the connection to the SIP server is lost. The polling unit may keep polling the SIP server. In one illustrative implementation, each unit that receives the broadcast message about the unavailability of the SIP server acts as if it had itself detected the unavailability of the SIP server and enters restricted mode. On the other hand, if the unit having the highest MAC address disappears from the network, the one having the highest MAC address among the remaining units will begin to poll the SIP server. If the SIP server's operational status is restored, the polling unit broadcasts this information to the network, after which the units resume normal mode operation.

Another fault state detection relates to the DHCP server. As is known to those skilled in the art, IP networks employ Dynamic Host Configuration Protocol, or DHCP, servers which normally allocate IP addresses to the network terminals. It is possible to operate a network or subnetwork with static IP addresses, but such a mode of operation is impractical in real-world networks. A normal DHCP server should be configured such that if a terminal's connection to the server is lost, there is adequate lease time left for IP addresses so that problem can be fixed until the lease time expires. For instance, if the lease time of addresses is 48 hours and the IP addresses are reallocated at 24-hour intervals, there will always be at least 24 hours left to fix problems relating to the DHCP server.

According to an implementation of the invention, if the DHCP server is out of operation long enough for the lease time of the IP addresses to expire, the terminals continue use of the latest IP address allocated to them.

In an alternative implementation, after a restart, for example, when the terminals are connected to a network, they generate their own IP addresses. A unit may generate its own IP addresses as follows. IP address generation loosely follows standard RFC 3927, with the major exception that this altered implementation adapts to an IP address space already being used in the LAN, whenever possible. First the unit observes the network and gathers IP addresses existing in the network for a predetermined period of time, after which it selects an available IP address itself. IP address selection is preferably performed by using IP packets which are certainly known to contain a correct IP address, such as precedence broadcast messages mentioned elsewhere in this patent specification. The selected IP address is preferably between the highest and lowest IP addresses gathered during the observation period.

In some situations this may not be possible. For instance, there may not be any gaps between the observed IP addresses. In such cases the unit may select the first IP address higher than the highest observed IP address. Alternatively, the first IP address lower than the lowest observed IP address may be selected for address generation. The unit carries out an Address Resolution Protocol (ARP) request, and if it receives no response to the ARP request, the unit begins to use the selected IP address. If a response is received, this means that the selected IP address is reserved (although it was not used for broadcasting during the observation period). Accordingly, the unit selects the next higher (or lower) IP address and retries the ARP request until an available IP address is determined.

Figure 5:
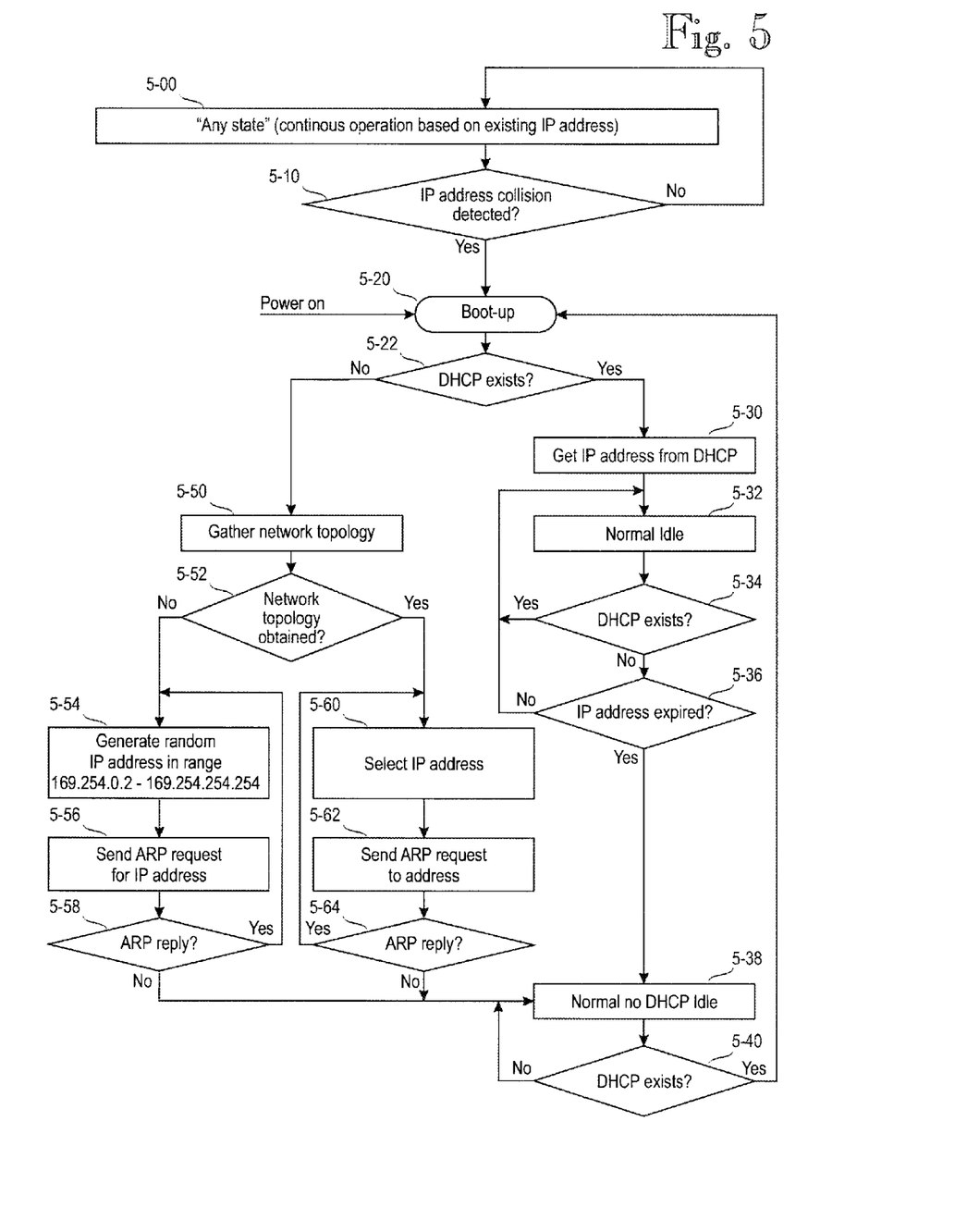
FIG. 5 is a flowchart illustrating IP address handling by a terminal according to some embodiments of the invention.

FIG. 5 is a flowchart illustrating IP address handling by terminal according to some embodiments of the invention. Reference numeral 5-00 does not denote some unambiguously identified state but rather denotes any state in the terminal's continuous operation, based on the terminal's pre-existing IP address, as typically defined in the aforementioned RFC standards. Reference numeral 5-10 denotes a test wherein a negative result of IP address collision detection test causes the terminal to remain in the previous state, whatever it was, while a positive result of IP address collision detection test causes a transfer to step 5-20, which is the initial state of the inventive restricted mode which is the topic of the present invention. It is also possible to reach step 5-20 via power-on operation. There may be alternative or additional diagnostic tests whose positive result causes a transition to the restricted mode beginning from step 5-20.

From step 5-20, the terminal proceeds to step 5-22 to check if DHCP service is available. If yes, the terminal obtains the IP address from the DHCP server in step 5-30 after which it proceeds to normal idle state operation in step 5-32. The terminal remains in normal idle state 5-32 until two consecutive checks 5-34 and 5-36 indicate, respectively, that DHCP service has disappeared and the lease time of the terminal's IP address has expired, in which case the terminal proceeds to normal no-DHCP idle state, denoted by reference sign 5-38. The terminal remains in normal no-DHCP idle state 5-38 until a check in step 5-40 indicates that DHCP service is available, after which the terminal proceeds to re-boot state 5-20 of the restricted mode.

On the other hand, if DHCP service is not available in step 5-22, the terminal proceeds to step 5-50 to gather the network topology information (cf. FIG. 4). In step 5-52 the terminal selects one of two branches, depending on whether or not sufficient information on the network topology has been obtained. In one illustrative implementation the terminal obtains such network topology information by listening to the network traffic and collecting IP addresses of senders and recipients of data packets for a predetermined time. If sufficient network topology information has not been obtained, the terminal takes branch 5-54 through 5-58, wherein the terminal generates a random IP address in some predetermined range (an exemplary range 169.254.0.2 through 169.254.254.254 is shown in FIG. 5) and sends an ARP request for the randomly-generated IP address. After that, in step 5-58 the terminal checks if a reply to the ARP request is received. If yes, the terminal returns to step 5-54.

In step 5-52, if the terminal has obtained sufficient network topology information, it takes branch 5-60 through 5-64, wherein the terminal selects an IP address and sends an ARP request to the selected IP address. After that, in step 5-64 the terminal checks if a reply to the ARP request is received. If yes, the terminal returns to step 5-60.

In steps 5-58 and 5-64, if the ARP request fails to result in an ARP reply, this means that the selected or randomly generated IP address appears to be available, and the terminal proceeds to normal no-DHCP idle state 5-38.

Figure 6:
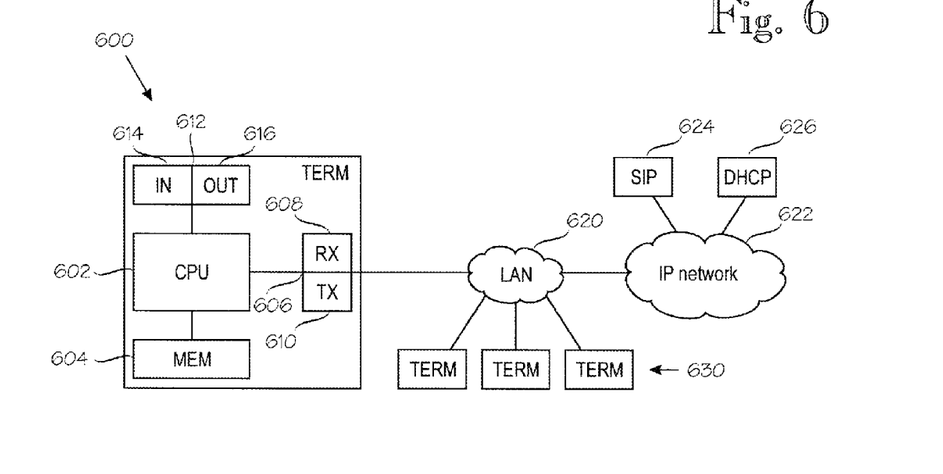
FIG. 6 is a schematic block diagram of terminal hardware.

FIG. 6 is a schematic block diagram of terminal hardware, generally denoted by reference numeral 600. The terminal hardware 600 comprises a central processing unit (CPU) 602, memory 604, reception/transmission circuitry (RX, TX) 606 which comprises a reception circuitry 608 and transmission circuitry 610. The reception/transmission circuitry 606 provides operational coupling of the terminal 600 with other terminals, generally denoted by reference numeral 630. The terminals 600, 630 are coupled via an IP network 622. In the example shown in FIG. 6, the terminal 600 is coupled to the IP network 622 via a local-area network 620.

The terminal hardware 600 further comprises a user interface circuitry 612 whose main sections are an input circuitry 614 and output circuitry 616. The input circuitry 614 comprises a microphone for voice input, dialing means, such as a keypad or touch-sensitive display and, optionally, a conveniently placed push-to-talk button for restricted mode operation (half duplex). For instance, the push-to-talk button may be positioned such that it is conveniently operated by the user's thumb. At this level of generalization, all elements 600 through 630 can be conventional as used in the relevant art.

The central processing unit (CPU) 602 executes the terminal software which is stored in the memory 604. The software is described in more detail in connection with FIG. 7.

Figure 7:
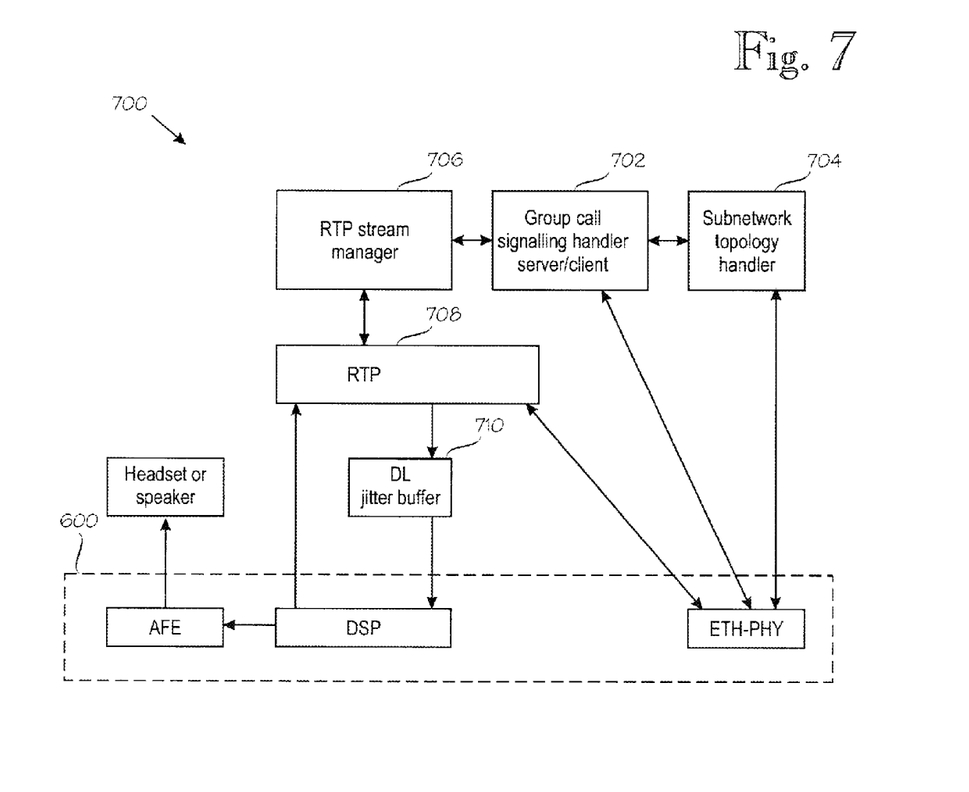
FIG. 7 is a schematic block diagram of terminal software.

FIG. 7 is a schematic block diagram of terminal software. The software is contained in the terminal's memory 604 from where the central processor 602 retrieves program sections as required. The reader as assumed to be familiar with the operation of a conventional IP terminal and only the novel elements of the present invention are described in detail and a detailed description of such conventional functionality is omitted. In addition to software implementing conventional IP terminal functionality, the terminal software, generally denoted by reference numeral 700, comprises logic sections 702 through 704 for implementing group calls in restricted mode in which the one or more network servers, such as a SIP and/or DHCP server, are absent.

In restricted mode operation, when the terminal receives an indication from its user that the terminal should establish a group call, the server functionality is provided by a group call signalling handler 702, which is typically implemented as a client/server module. The server part is operational in the unit that initiates the group call, while the client part is operational in other participants of the group call. The group call signalling handler 702 queries a subnetwork topology handler 704 for available terminals and invites such terminals to the group call. The invited terminals will act as clients. The group call signalling handler 702 regularly queries the subnetwork topology handler 704 for any change in the terminals present in the subnetwork. Any newly-added terminals may be added to join an existing group call. Conversely, any terminal detected as disappeared by the subnetwork topology handler 704, are removed from the list of group call participants. Operation of the subnetwork topology handler 704 was described earlier, in connection with FIG. 4.

An RTP stream manager 706 controls streaming of audio packets according to information received from group call signalling handler 702. For instance, the RTP stream manager 706 may configure and start an RTP stream containing audio information, while the group call signalling handler 702, acting as a client, has received the token. In downlink direction (data to speech), propagation time differences between UDP data packets may be reduced or eliminated by a downlink jitter buffer 710.

In a typical implementation, all inter-process interfacing in the terminal may take place via FIFO message buffers.

It is readily apparent to a person skilled in the art that, as the technology advances, the inventive concept can be implemented in various ways. The invention and its embodiments are not limited to the examples described above but may vary within the scope of the claims.

What is claimed is:

1. An Internet Protocol (IP) terminal, comprising:
   means for communicating via an IP network;
   a processor; and
   memory, wherein the memory contains operating software for the IP terminal and the processor is configured to execute the operating software, wherein the operating software comprises a normal mode logic for implementing a normal mode operation and a restricted mode logic for implementing a restricted mode operation, the normal mode logic comprising program code for initiating a call of a first type under control of instructions from one or more dedicated servers, and the restricted mode logic comprising program code for collecting connection information of other IP terminals and for initiating a call of a second type without instructions from the one or more dedicated servers.

2. An IP terminal according to claim 1, further comprising means for spontaneous mode transition from the normal mode operation to the restricted mode operation in response to at least one of the following:
   a positive determination that a connection to the IP network is lost; or
   a positive determination that a connection to at least one of the one or more dedicated servers has failed after a most recent reset of the IP terminal.

3. An IP terminal according to claim 2, further comprising means for spontaneous mode transition from the restricted mode operation to the normal mode operation in response to a positive determination that a connection to at least one of the one or more dedicated servers has been restored after the IP terminal's latest mode transition to the restricted mode operation.

4. An IP terminal according to claim 1, further comprising:
   means for assigning a role to the IP terminal, in response to a user input; and
   means for originating a call to another IP terminal and/or for responding to a call from another IP terminal, wherein the call is addressed on the basis of the role assigned to the IP terminal receiving the call, whereby the IP terminal can communicate with the other IP terminal without having to know an identity of the receiving IP terminal or its user.

5. An IP terminal according to claim 4, further comprising:
   means for assigning a role to the IP terminal, in response to a user input;
   means for responding to an incoming call from another IP terminal, wherein signalling relating to the incoming call indicates the role assigned to the IP terminal originating the call; and
   means for assigning a priority to the incoming call based on the role assigned to the IP terminal originating the call.

6. An IP terminal according to claim 1, wherein the normal mode logic comprises program code for accepting an IP address allocated by a dedicated server and the restricted mode logic comprises an IP address handler configured to allocate an IP address to the IP terminal itself.

7. An IP terminal according to claim 6, wherein the IP address handler comprises program code for periodically broadcasting the IP terminal's own presence.

8. An IP terminal according to claim 1, wherein the restricted mode logic comprises program code for initiating and/or controlling a group call of the second type and the IP terminal is configured to participate in the group call of the second type and to invite at least two other IP terminals to the group call of the second type.

9. An IP terminal according to claim 8, wherein the IP terminal comprises means for allocating a transmission privilege to one participating terminal at a time.

10. An IP terminal according to claim 9, wherein the means for allocating a transmission privilege comprises means for implementing a token-passing resource reservation scheme.

11. An IP terminal according to claim 9, further comprising means for outputting an audible and/or visual indication of the transmission privilege allocated to the IP terminal.

12. An operating method for an Internet Protocol (IP) terminal, which comprises a processor and memory, wherein the memory contains operating software for the IP terminal and the processor is configured to execute the operating software, thus carrying out the operating method for the IP terminal, the method comprising:
    communicating via an IP network in a normal mode, wherein communicating in the normal mode comprises initiating a call of a first type under control of instructions from one or more dedicated servers; and
    communicating via the IP network in a restricted mode, wherein communicating in the restricted mode comprises collecting connection information of other IP terminals and for initiating a call of a second type without instructions from the one or more dedicated servers.

13. A non-transitory computer-readable storage medium comprising instructions that, when executed by a processing device, cause the processing device to perform operating software for an Internet Protocol (IP) terminal by:
    communicating via an IP network in a normal mode, wherein communicating in the normal mode comprises initiating a call of a first type under control of instructions from one or more dedicated servers; and
    communicating via the IP network in a restricted mode, wherein communicating in the restricted mode comprises collecting connection information of other IP terminals and for initiating a call of a second type without instructions from the one or more dedicated servers.

14. The non-transitory computer-readable storage medium according to claim 13, wherein the non-transitory computer readable storage medium is a memory device for the IP terminal.

* * * * *